(12) United States Patent
Takeuchi

(10) Patent No.: US 8,736,483 B2
(45) Date of Patent: May 27, 2014

(54) COLLISION AVOIDANCE APPARATUS

(75) Inventor: Koji Takeuchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/508,452

(22) PCT Filed: Nov. 27, 2009

(86) PCT No.: PCT/JP2009/006445
§ 371 (c)(1),
(2), (4) Date: May 7, 2012

(87) PCT Pub. No.: WO2011/064824
PCT Pub. Date: Jun. 3, 2011

(65) Prior Publication Data
US 2012/0235853 A1    Sep. 20, 2012

(51) Int. Cl.
*G08G 1/16*     (2006.01)
*G01S 13/93*    (2006.01)

(52) U.S. Cl.
USPC .................. 342/71; 701/70; 701/301

(58) Field of Classification Search
USPC ..................................... 342/70–72
See application file for complete search history.

(56) References Cited

U.S. PATENT DOCUMENTS

| | | | | |
|---|---|---|---|---|
| 6,097,332 A * | 8/2000 | Crosby, II | ......... | 342/72 |
| 6,529,814 B2 * | 3/2003 | Ishizu et al. | ......... | 701/96 |
| 6,628,227 B1 * | 9/2003 | Rao et al. | ......... | 342/70 |
| 6,650,983 B1 * | 11/2003 | Rao et al. | ......... | 701/45 |
| 6,650,984 B1 * | 11/2003 | Rao et al. | ......... | 701/45 |
| 6,728,617 B2 * | 4/2004 | Rao et al. | ......... | 701/45 |

(Continued)

FOREIGN PATENT DOCUMENTS

| DE | 198 45 568 A1 | 10/1999 |
|---|---|---|
| DE | 102 31 555 A1 | 1/2003 |

(Continued)

OTHER PUBLICATIONS

International Search Report Issued Mar. 2, 2010 in PCT/JP09/06445 Filed Nov. 27, 2009.

*Primary Examiner* — Matthew M Barker
(74) *Attorney, Agent, or Firm* — Oblon, Spivak, McClelland, Maier & Neustadt, L.L.P.

(57) ABSTRACT

A collision avoidance apparatus capable of executing an appropriate vehicle control in order to avoid a collision between an own vehicle and a movable object is provided. A collision avoidance apparatus for avoiding a collision between an own vehicle and a movable object includes: a laterally-existing movable object detector for detecting for a movable object that approaches from a direction lateral to the own vehicle; a side collision determination section for determining whether or not a risk that the own vehicle and the movable object collide with each other is high, when the laterally-existing movable object detector has detected the movable object that approaches from the direction lateral to the own vehicle; a passage and avoidance determination section for determining, when the risk that the own vehicle and the movable object collide with each other is determined to be high, whether or not a possibility that a collision between the own vehicle and the movable object can be avoided by the own vehicle passing in front of the movable object, is high; and an accelerated state/decelerated state controller for controlling the own vehicle to be in one of an accelerated state and a decelerated state, according to a determination result of the passage and avoidance determination section.

4 Claims, 8 Drawing Sheets

(56) References Cited

U.S. PATENT DOCUMENTS

| | | | |
|---|---|---|---|
| 6,825,756 B2* | 11/2004 | Bai et al. | 340/435 |
| 6,873,286 B2* | 3/2005 | Albero et al. | 342/71 |
| 7,132,976 B2* | 11/2006 | Shinoda et al. | 342/70 |
| 7,283,907 B2* | 10/2007 | Fujiwara et al. | 701/301 |
| 7,453,374 B2* | 11/2008 | Koike et al. | 340/903 |
| 8,244,458 B1* | 8/2012 | Blackburn | 701/301 |
| 8,483,945 B2* | 7/2013 | Herink | 701/302 |
| 8,589,060 B2* | 11/2013 | Becker | 701/301 |
| 2003/0030583 A1* | 2/2003 | Finn | 342/70 |
| 2004/0030499 A1 | 2/2004 | Knoop et al. | |
| 2004/0039513 A1 | 2/2004 | Knoop et al. | |
| 2005/0090950 A1* | 4/2005 | Sawamoto et al. | 701/23 |
| 2006/0282218 A1 | 12/2006 | Urai et al. | |
| 2007/0050114 A1 | 3/2007 | Koike et al. | |
| 2008/0312834 A1* | 12/2008 | Noda et al. | 701/301 |
| 2009/0212993 A1* | 8/2009 | Tsunekawa et al. | 342/71 |
| 2010/0225522 A1* | 9/2010 | DeMersseman | 342/72 |
| 2010/0228419 A1* | 9/2010 | Lee et al. | 701/25 |

FOREIGN PATENT DOCUMENTS

| | | |
|---|---|---|
| DE | 102 31 557 A1 | 7/2003 |
| DE | 103 28 062 A1 | 1/2005 |
| DE | 10 2008 005 305 A1 | 7/2009 |
| JP | 2006 347252 | 12/2006 |
| JP | 2007 22263 | 2/2007 |
| JP | 2007 91207 | 4/2007 |
| JP | 2008 62873 | 3/2008 |
| JP | 2009 208560 | 9/2009 |

* cited by examiner

TIME T = t1

TIME T = t2

COLLISION AVOIDANCE APPARATUS

TECHNICAL FIELD

The present invention relates to collision avoidance apparatuses for use in vehicles, and more particularly to collision avoidance apparatuses for avoiding side collision between vehicles.

BACKGROUND ART

Apparatuses and systems for predicting collision between vehicles, and controlling the vehicles so as to avoid the collision have been developed to date.

An example of the collision avoidance apparatus as described above is disclosed in Patent Literature 1. A vehicle travelling support apparatus disclosed in Patent Literature 1 firstly obtains information on travelling of another vehicle, such as a position of the other vehicle approaching an own vehicle, by communication between the vehicles. Subsequently, the vehicle travelling support apparatus determines whether or not the own vehicle collides with the other vehicle, based on a travelling state of the own vehicle, and the information on the travelling of the other vehicle. When the collision between the own vehicle and the other vehicle is predicted, the vehicle travelling support apparatus controls the travelling state of the own vehicle so as to alleviate impact of the collision. Specifically, the vehicle travelling support apparatus executes a vehicle control by, for example, decreasing a speed of the own vehicle according to a steered state of the other vehicle.

CITATION LIST

Patent Literature

Patent Literature 1: Japanese Laid-Open Patent Publication No. 2007-022263

SUMMARY OF THE INVENTION

Problems to be Solved by the Invention

However, the vehicle travelling support apparatus disclosed in Patent Literature 1 has the following problems. Namely, an optimal vehicle control for avoiding the collision between the own vehicle and the other vehicle may not be able to be executed.

Once the vehicle travelling support apparatus described above starts to execute the vehicle control for avoiding the collision by, for example, decreasing a speed of the own vehicle, the contents of the control are not changed. On the other hand, the travelling states of the own vehicle and the other vehicle change from moment to moment, and therefore the vehicle control being executed is not always an optimal vehicle control for avoiding the collision.

For example, a case is assumed in which a possibility that the other vehicle collides with the own vehicle at the front-lateral side portion of the own vehicle is determined to be high in a state where a distance between the own vehicle and the other vehicle is relatively great, and a control for decreasing a speed of the own vehicle is executed. Even if such a control is executed, the other vehicle may approach the rear-lateral side portion of the own vehicle in practice during the passage of time. In such a case, by another vehicle control being executed instead of continuing the control for decreasing the speed of the own vehicle, a collision between the own vehicle and the other vehicle may be avoided with enhanced certainty.

Thus, in conventional arts, an optimal vehicle control for avoiding a collision between the own vehicle and another vehicle may not be able to be executed.

The present invention is made in order to solve the aforementioned problems, and an object of the present invention is to make available a collision avoidance apparatus that enables an appropriate vehicle control for avoiding a collision between an own vehicle and a movable object to be executed.

Solution to the Problems

In order to solve the aforementioned problems, the present invention has the following features. Specifically, a first aspect of the present invention is directed to a collision avoidance apparatus for avoiding a collision between an own vehicle and a movable object, and the collision avoidance apparatus includes: a laterally-existing movable object detector for detecting for a movable object that approaches from a direction lateral to the own vehicle; a side collision determination section for determining whether or not a risk that the own vehicle and the movable object collide with each other is high, when the laterally-existing movable object detector has detected the movable object that approaches from the direction lateral to the own vehicle; a passage and avoidance determination section for determining, when the risk that the own vehicle and the movable object collide with each other is determined to be high, whether or not a possibility that the own vehicle passes in front of the movable object and a collision between the own vehicle and the movable object can be avoided, is high; and an accelerated state/decelerated state controller for controlling the own vehicle to be in one of an accelerated state and a decelerated state, according to a determination result of the passage and avoidance determination section.

In a second aspect based on the first aspect, an automatic deceleration section for automatically decelerating the own vehicle when the risk that the own vehicle and the movable object collide with each other is determined to be high, and a deceleration detector for detecting a deceleration of the own vehicle when the own vehicle is decelerating, are further provided, and the accelerated state/decelerated state controller controls the automatic deceleration section to reduce a deceleration so as to be less than a deceleration having been most recently detected, when the passage and avoidance determination section determines the possibility that a collision between the own vehicle and the movable object can be avoided, is high.

In a third aspect based on the second aspect, a travelling information detector for detecting information on travelling of each of the own vehicle and the movable object, and a target deceleration calculator for calculating a target deceleration of the own vehicle, which is required to avoid a collision between the own vehicle and the movable object, based on the information, on travelling of each of the own vehicle and the movable object, which has been most recently obtained, are further provided, and the accelerated state/decelerated state controller controls the automatic deceleration section such that the deceleration becomes less than or equal to the target deceleration.

In a fourth aspect based on the third aspect, the travelling information detector includes: an own vehicle speed detector for detecting a travelling speed Vh (km/h) of the own vehicle, and a movable object information detector for detecting: a speed component Vw (km/h) of a speed at which the movable object travels, in a direction orthogonal to a travelling direction of the own vehicle; a distance H (km) in the travelling direction of the own vehicle from a lateral side end, of the movable object, which is directed in a same direction as the travelling direction of the own vehicle, to a rear end of the own vehicle; and a distance W (km) in the direction orthogonal to the travelling direction of the own vehicle from a lateral side end, of the own vehicle, which is opposed to a direction from which the movable object approaches, to a front end of the movable object, and when the target deceleration is represented as GT (km/h/s), the target deceleration calculator calculates, as a target deceleration GT, a value satisfying equation (A) indicated below:

$$GT = 2 \times Vh \times Vw/W - 2 \times Vw^2 \times H/W^2 \qquad (A).$$

In a fifth aspect, the automatic deceleration section automatically decelerates the own vehicle by automatically generating a braking force for the own vehicle, and the accelerated state/decelerated state controller enhances the braking force generated by the automatic deceleration section to reduce a deceleration of the own vehicle when the passage and avoidance determination section determines that a possibility that a collision between the own vehicle and the movable object can be avoided, is high.

In a sixth aspect based on one of the first aspect and the second aspect, a driving force controller for controlling a driving force for the own vehicle is further provided, and the accelerated state/decelerated state controller causes the driving force controller to enhance a driving force for the own vehicle to accelerate the own vehicle when the passage and avoidance determination section determines that a possibility that a collision between the own vehicle and the movable object can be avoided, is high.

In a seventh aspect based on the first aspect, the passage and avoidance determination section determines whether or not a risk that the movable object collides with the own vehicle in a rear lateral end portion of the own vehicle is high, and the passage and avoidance determination section determines, when determining that the risk that the movable object collides with the own vehicle in the rear lateral end portion of the own vehicle is high, that a possibility that the collision between the own vehicle and the movable object can be avoided by the own vehicle passing in front of the movable object, is high.

In an eighth aspect based on the seventh aspect, the laterally-existing movable object detector includes: a front-lateral side radar device for detecting for an object that exists front-lateral to the own vehicle; and a rear-lateral side radar device for detecting for an object that exists rear-lateral to the own vehicle, and the side collision determination section determines whether or not a risk that the own vehicle and the movable object collide with each other is high, based on an object detection result obtained by the front-lateral side radar device and the rear-lateral side radar device.

In a ninth aspect based on the first aspect, the passage and avoidance determination section includes: a rear-lateral side radar detection determination section for determining whether or not the movable object has been detected by a rear-lateral side radar device; a time determination section for calculating a predicted time that is to elapse before the movable object collides with the own vehicle, and determining whether or not the predicted time indicates a value less than or equal to a predetermined threshold value; a predicted position determination section for calculating a predicted position of the own vehicle and a predicted position of the movable object which are to be obtained when the predicted time has elapsed, and determining whether or not the predicted position of the movable object is within a range defined relative to the predicted position of the own vehicle; and an overall determination section for determining that a risk that the movable object collides with the own vehicle in a rear lateral end portion of the own vehicle, is high, when it is determined that the rear-lateral side radar device has detected the movable object, it is determined that the predicted time indicates a value less than or equal to the predetermined threshold value, and it is determined that the predicted position of the movable object is within the range defined relative to the predicted position of the own vehicle.

Advantageous Effects of the Invention

According to the first aspect, an appropriate vehicle control for avoiding a collision between the own vehicle and a movable object can be executed. Specifically, whether or not a possibility that a collision can be avoided by allowing the own vehicle to pass in front of the movable object approaching from a direction lateral to the own vehicle, is high is repeatedly determined. Therefore, a content of control of the own vehicle can be changed in real time according to the determination result. Thus, a collision between the own vehicle and another vehicle in passing can be avoided with enhanced certainty.

According to the second aspect, even after a speed of the own vehicle is reduced in order to avoid a collision between the own vehicle and the movable object, the deceleration of the own vehicle can be controlled according to a predicted position at which the collision with the own vehicle occurs.

According to the third aspect, an accelerated state or a decelerated state of the own vehicle can be changed according to the target deceleration required for avoiding a collision with the movable object. Therefore, the collision between the own vehicle and the movable object can be avoided with enhanced certainty. Further, the target deceleration can be accurately calculated with the use of the most recently obtained information on travelling of each of the own vehicle the movable object.

According to the fourth aspect, the target deceleration can be calculated by using a parameter which can be relatively easily detected, and by using a simple calculation process. Therefore, the target deceleration can be quickly calculated in a reduced amount of process steps, to appropriately control the traveling of the own vehicle.

According to the fifth aspect, a braking force for the own vehicle is controlled, thereby controlling a speed and a deceleration of the own vehicle with ease and certainty.

According to the sixth aspect, in a case where the own vehicle attempts to avoid a collision by passing in front of the movable object, even if a speed of the own vehicle is insufficient, the own vehicle can be accelerated to avoid the collision.

According to the seventh aspect, whether or not a collision can be avoided by the own vehicle passing in front of the movable object can be determined in a simple process.

According to the eighth aspect, a movable object in a wide range around the own vehicle can be detected, with the use of a plurality of radar devices, with ease and accuracy.

According to the ninth aspect, whether or not a risk that the movable object collides with the own vehicle in the rear lateral portion of the own vehicle is high, i.e., whether or not a collision can be avoided by the own vehicle passing in front of the movable object, can be determined in a simple process.

DESCRIPTION OF EMBODIMENTS (First Embodiment)

Figure 1:
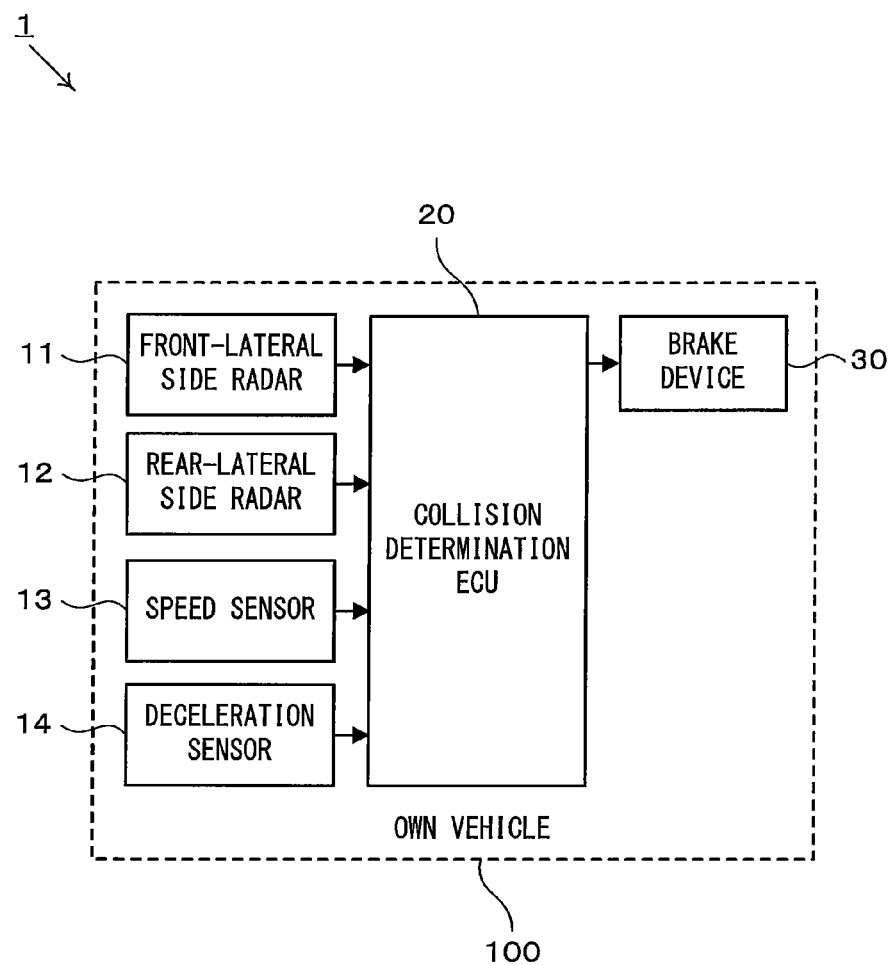
FIG. 1 is a block diagram illustrating a structure of a collision avoidance apparatus 1 according to a first embodiment.

Hereinafter, a collision avoidance apparatus 1 according to a first embodiment of the present invention will be described. Firstly, a structure of the collision avoidance apparatus 1 will be described with reference to FIG. 1. FIG. 1 is a block diagram illustrating the structure of the collision avoidance apparatus 1 according to the first embodiment of the present invention. The collision avoidance apparatus 1 includes a front-lateral side radar 11, a rear-lateral side radar 12, a speed sensor 13, a deceleration sensor 14, a collision determination ECU 20, and a brake device 30. Hereinafter, an exemplary case in which the collision avoidance apparatus 1 is mounted to an own vehicle 100 will be described.

Figure 2:
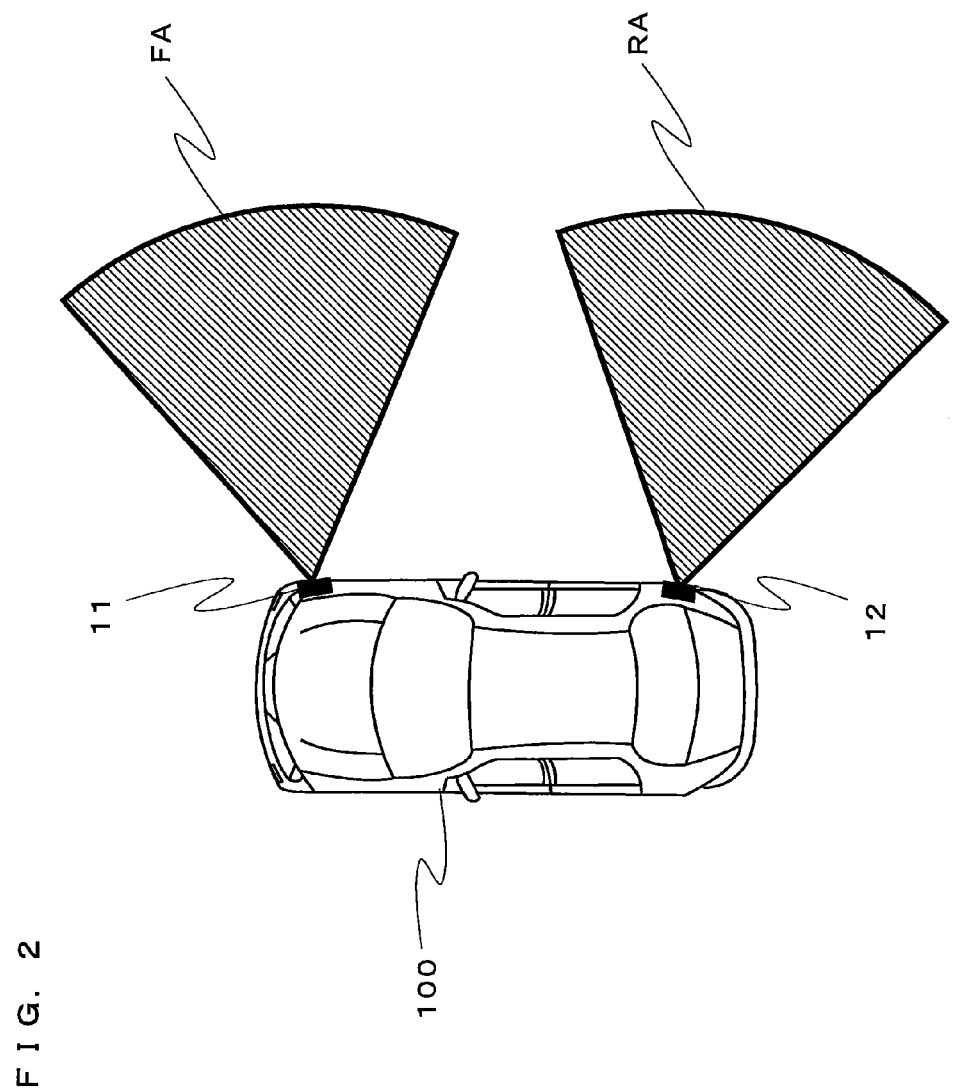
FIG. 2 is a diagram of a mounted state illustrating positions at which a front-lateral side radar 11 and a rear-lateral side radar 12 are mounted to an own vehicle 100.

The front-lateral side radar 11 is a radar device for detecting for an object that exists front-lateral to the own vehicle 100, or approaches from a direction front-lateral to the own vehicle 100. For example, the front-lateral side radar 11 is mounted to the front right side portion of the own vehicle 100 as shown in FIG. 2. FIG. 2 is a diagram of a mounted state illustrating positions at which the front-lateral side radar 11 and the rear-lateral side radar 12 are mounted to the own vehicle 100. In FIG. 2, a region FA represents a region within which an object detectable by the front-lateral side radar 11 exists. When the front-lateral side radar 11 has detected a movable object in the region FA that is front-lateral to the own vehicle 100, the front-lateral side radar 11 detects information on travelling of the movable object relative to the own vehicle 100. Specifically, the front-lateral side radar 11 detects a relative speed V (km/h) of the movable object relative to the own vehicle 100, and a distance D (km) from the movable object to the own vehicle 100, as the information on the travelling of the movable object. The front-lateral side radar 11 transmits, to the collision determination ECU 20, data representing the relative speed V and the distance D. As a method used by the front-lateral side radar 11 for detecting the relative speed V and the distance D, any conventionally known method may be used.

The rear-lateral side radar 12 is a radar device for detecting for an object that exists rear-lateral to the own vehicle 100, or approaches from a direction rear-lateral to the own vehicle 100. For example, the rear-lateral side radar 12 is mounted to the rear right side portion of the own vehicle 100 as shown in FIG. 2. In FIG. 2, a region RA represents a region within which an object detectable by the rear-lateral side radar 12 exists. When the rear-lateral side radar 12 has detected a movable object in the region RA that is rear-lateral to the own vehicle 100, the rear-lateral side radar 12 detects information on travelling state of the movable object. Specifically, the rear-lateral side radar 12 detects a relative speed V, a distance D, an orthogonal speed component Vw (km/h), an own vehicle travelling direction distance H (km), and an own vehicle lateral distance W (km). A coordinate system in which an axis line representing a travelling direction of the own vehicle 100 is defined as a Y axis, and an axis line orthogonal to the Y axis on the horizontal plane is defined as an X axis, is assumed (see FIG. 5). The orthogonal speed component Vw represents a speed component, in the X-direction, of a traveling speed of the movable object. The own vehicle travelling direction distance H (km) represents a Y-axis component distance, from a lateral side end, of the movable object, which is directed in the same direction as the travelling direction of the own vehicle 100, to the rear end of the own vehicle 100. The own vehicle lateral distance W represents a distance in the X-axis direction, from the lateral side end, of the own vehicle 100, which is opposed to the direction from which the movable object approaches, to the front end of the movable object. The rear-lateral side radar 12 detects the relative speed V, the distance D, the orthogonal speed component Vw, the own vehicle travelling direction distance H, and the own vehicle lateral distance W, and transmits data representing each of them, to the collision determination ECU 20. As a method used by the rear-lateral side radar 12 for detecting the orthogonal speed component Vw, the own vehicle travelling direction distance H, and the own vehicle lateral distance W, any conventionally known method may be used.

As shown in FIG. 2, since the collision avoidance apparatus 1 according to the first embodiment includes a plurality of radar devices such as the front-lateral side radar 11 and the rear-lateral side radar 12, the movable object that approaches from a direction lateral to the own vehicle 100 can be detected in a wide range. The number of the radar devices included in the collision avoidance apparatus 1 is not limited to the number described above, and the number of the radar devices included therein may be greater than or equal to three. Further, in a case where a single radar can perform detection with a sufficient resolution, and in a sufficient range, the single radar device may double as both the front-lateral side radar 11 and the rear-lateral side radar 12.

The speed sensor 13 is a sensor device for detecting a travelling speed Vh (km/h) of the own vehicle 100. The speed sensor 13 transmits, to the collision determination ECU 20, data representing the travelling speed Vh of the own vehicle 100, which has been detected. As a method used by the speed sensor 13 for detecting the travelling speed Vh, any conventionally known method may be used.

The deceleration sensor 14 is a sensor device for detecting a deceleration G (km/h/s) of the own vehicle 100. The deceleration sensor 14 transmits, to the collision determination ECU 20, data representing the deceleration G of the own vehicle 100, which has been detected. As a method used by the deceleration sensor 14 for detecting the deceleration G; any conventionally known method may be used.

The collision determination ECU 20 is typically a control device that includes an information processing apparatus such as a CPU (Central Processing Unit), a storage device such as a memory, and an interface circuit. The collision determination ECU 20 controls the brake device 30 based on data obtained from the front-lateral side radar 11, the rear-lateral side radar 12, and the speed sensor 13, to control an accelerated state or a decelerated state of the own vehicle 100.

The process performed by the collision determination ECU 20 will be described below in detail.

The brake device 30 is a braking device for generating a braking force for the own vehicle 100. The brake device 30 generates a braking force for the own vehicle 100 according to an instruction from the collision determination ECU 20.

Figure 3:
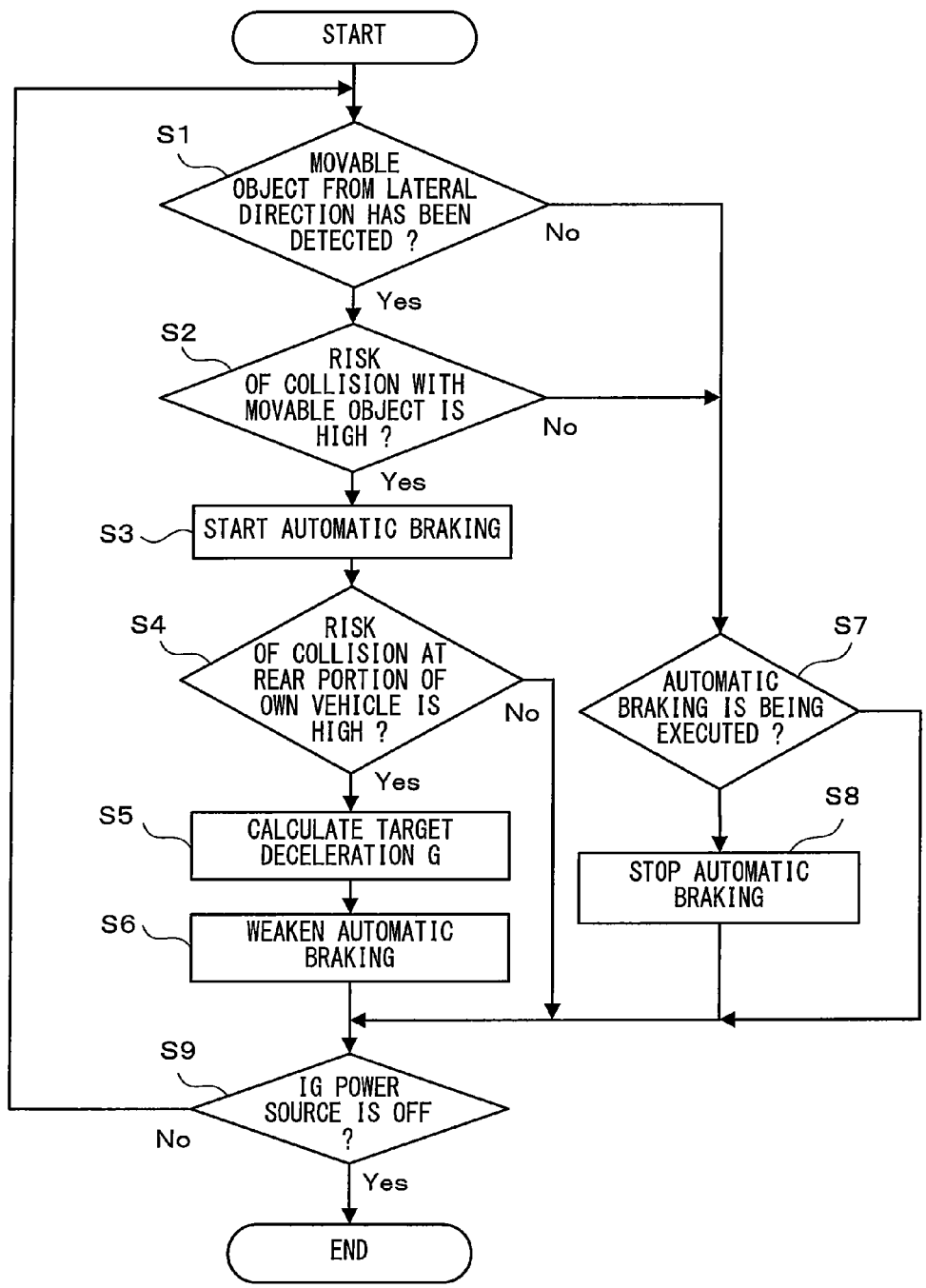
FIG. 3 is a flow chart showing a process performed by a collision determination ECU 20 according to the first embodiment.

Next, a process performed by the collision determination ECU 20 will be described with reference to FIG. 3. FIG. 3 is a flow chart showing an exemplary process performed by the collision determination ECU 20 according to the first embodiment. When, for example, an IG power source of the own vehicle 100 is set to be on, the collision determination ECU 20 performs the process shown in FIG. 3.

The collision determination ECU 20 firstly determines whether or not a movable object approaching from a lateral direction has been detected (step S1). Specifically, the collision determination ECU 20 determines whether or not information on travelling of a movable object has been received from the front-lateral side radar 11 or the rear-lateral side radar 12. When the collision determination ECU 20 has received the information on travelling of a movable object, the collision determination ECU 20 determines that a movable object approaching from the lateral direction has been detected (Yes in step S1), and determines whether or not a risk that the movable object and the own vehicle 100 collide with each other is high (step S2). On the other hand, when the collision determination ECU 20 receives no information on travelling of a movable object, the collision determination ECU 20 determines that a movable object approaching from the lateral direction has not been detected (No in step Si), and advances the process to step S7.

In step S2, the collision determination ECU 20 firstly calculates a time which is to elapse before collision between the movable object and the own vehicle 100, as a predicted collision time TTC, according to the following equation (1).

$$TTC = D/V \tag{1}$$

Subsequently, the collision determination ECU 20 determines whether or not the predicted collision time TTC indicates a value that is less than or equal to a predetermined threshold value Thc. The threshold value Thc is a constant that is previously stored in the storage device of the collision determination ECU 20. When the predicted collision time TTC indicates a value that is less than or equal to the threshold value Thc, the collision determination ECU 20 determines that a risk that the movable object and the own vehicle 100 collide with each other is high (Yes in step S2), and starts automatic braking (step S3). On the other hand, when the predicted collision time TTC indicates a value that is greater than the threshold value Thc, the collision determination ECU 20 determines that a risk that the movable object and the own vehicle 100 collide with each other is low (No in step S2), and advances the process to step S7.

The process step described above is an exemplary process step of step S2. The collision determination ECU 20 may determine whether or not a risk that the movable object and the own vehicle 100 collide with each other is high, by using a conventionally known method.

In step S3, the collision determination ECU 20 transmits, to the brake device 30, an instruction signal for automatically generating a braking force for the own vehicle 100, regardless of an operation performed by a driver of the own vehicle 100. Hereinafter, the automatic operation performed by the brake device 30 according to the process of the collision determination ECU 20 is referred to as automatic braking. When the automatic braking has been already started, the collision determination ECU 20 transmits, to the brake device 30, an instruction signal for instructing the automatic braking to be continued. After the own vehicle 100 has started the braking, the collision determination ECU 20 determines whether or not a risk that the own vehicle 100 and the movable object collide with each other in the rear portion of the own vehicle 100, is high (step S4).

In the process steps of step S1 to step S3, when a risk that the movable object and the own vehicle 100 collide with each other is high, the automatic braking is started. Namely, a control for decreasing the travelling speed of the own vehicle 100 is executed.

In step S4, the collision determination ECU 20 determines whether or not, for example, a first to a third conditions described below are all satisfied. When all of the first to the third conditions are satisfied, a risk that the own vehicle 100 and the movable object collide with each other in the rear portion of the own vehicle 100, is determined to be high.

The first condition is that a movable object has been detected by the rear-lateral side radar 12.

The second condition is that the own vehicle travelling direction distance H indicates a value that is less than or equal to a predetermined threshold value THh, and the own vehicle lateral distance W indicates a value that is less than or equal to a predetermined threshold value THw.

The third condition is that a predicted travelling direction distance H2 indicates a value that is less than or equal to a predetermined threshold value THh2, and a predicted lateral distance W2 indicates a value that is less than or equal to a predetermined threshold value THw2. The predicted travelling direction distance H2 represents a predicted value of the own vehicle travelling direction distance H to be obtained when the collision time TTC becomes zero. The predicted lateral distance W2 represents a predicted value of the own vehicle lateral distance W to be obtained when the collision time TTC becomes zero. Specifically, the collision determination ECU 20 firstly predicts a positional relationship between the own vehicle 100 and the movable object, which is to be obtained when the collision time TTC elapses after the current time, based on the information on the movable object, which has been previously received from the front-lateral side radar 11 and the rear-lateral side radar 12, and performs mapping. The own vehicle travelling direction distance H and the own vehicle lateral distance W obtained based on the predicted positional relationship are calculated as the predicted travelling direction distance H2 and the predicted lateral distance W2, respectively. A technique used by the collision determination ECU 20 for predicting the positional relationship between the own vehicle 100 and the movable object, to be obtained when a predetermined time elapses, is a conventionally known technique, and a detailed description thereof is not given.

In the process step of step S4, the collision determination ECU 20 is allowed to determine whether or not a risk that the own vehicle 100 and the movable object collide with each other in the rear portion of the own vehicle 100 is high, in a simple process. Namely, the collision determination ECU 20 is allowed to easily determine whether or not a possibility that the own vehicle 100 can avoid the collision by passing in front of the movable object, is high. The process step described above is an exemplary process step of step S4, and the collision determination ECU 20 may perform the determination by using any manner, other than the process step described above, by which whether or not a possibility that the own vehicle 100 can avoid the collision by passing in front of the movable object is high can be determined. For example, when any one of the first to the third conditions is satisfied, the collision determination ECU 20 may determine that a risk that the own vehicle 100 and the movable object collide with each other in the rear portion of the own vehicle 100 is high. Further, the collision determination ECU 20 may determine whether or not a risk that the own vehicle 100 and the movable object collide with each other in the rear portion of the own vehicle 100 is high, by using any conventionally known technique.

When the collision determination ECU 20 determines that a risk that the own vehicle 100 and the movable object collide with each other in the rear portion of the own vehicle 100 is low (No in step S4), the process is advanced to step S9.

On the other hand, when the collision determination ECU 20 determines that a risk that the own vehicle 100 and the movable object collide with each other in the rear portion of the own vehicle 100 is high (Yes in step S4), a target deceleration GT is calculated (step S5). The target deceleration GT is a deceleration of the own vehicle 100 which is to be required to avoid the collision with the movable object. Specifically, the collision determination ECU 20 calculates the target deceleration GT according to the following equation (2).

$$GT = 2 \times Vh \times Vw/W - 2 \times Vw^2 \times H/W^2 \qquad (2)$$

In equation (2), a sign "^" represents an exponentiation operator.

The collision determination ECU 20 calculates the target deceleration GT, and lessens the automatic braking according to the target deceleration GT (step S6). Specifically, the collision determination ECU 20 controls a braking force by the brake device 30 such that the deceleration G of the own vehicle 100 becomes less than or equal to the target deceleration GT. When the collision determination ECU 20 has performed the process step of step S6, the process is advanced to step S9.

In the process steps of step S4 to step S6, when a possibility that the movable object collides with the own vehicle 100 in the rear lateral side portion of the own vehicle 100 is high, the braking force of the automatic braking is reduced such that the deceleration of the own vehicle 100 becomes less than or equal to the target deceleration GT. Namely, when a possibility that a collision can be avoided by the own vehicle 100 passing in front of the movable object is high, the accelerated state or the decelerated state of the own vehicle 100 is controlled such that the deceleration of the own vehicle 100 becomes less than or equal to the target deceleration GT. Therefore, a collision between the own vehicle 100 and the movable object can be avoided with enhanced certainty. Further, in the process step of step S5, the target deceleration GT can be calculated in a simple calculation process.

The calculation method for calculating the target deceleration GT as described above is an exemplary one. The collision determination ECU 20 may calculate the target deceleration GT by using any conventionally known method. Further, the collision determination ECU 20 may previously store the target deceleration GT as a constant in the storage device, and control the braking force of the automatic braking based on the constant. When a constant is used as the target deceleration GT, a process step of calculating the target deceleration GT can be omitted, so that the control for the decelerated state of the own vehicle 100 can be executed in a relatively short time period. Further, the collision determination ECU 20 may execute any vehicle control, other than the above-described control, which enables the deceleration G of the own vehicle 100 to be decreased.

On the other hand, in step S7, the collision determination ECU 20 determines whether or not the automatic baking is being executed. When the collision determination ECU 20 determines that the automatic braking is being executed (Yes in step S7), the automatic braking is stopped (step S8). Specifically, the collision determination ECU 20 transmits, to the brake device 30, an instruction signal for stopping the automatic braking. On the other hand, when the collision determination ECU 20 determines that the automatic braking is not being executed (No in step S7), the process step of step S8 is skipped, and the process is advanced to step S9.

In the process steps of step S1, step S2, step S7, and step S8, when no movable object is detected by the front-lateral side radar 11 or the rear-lateral side radar 12, or when a risk that the movable object and the own vehicle 100 collide with each other is low, the automatic braking is stopped. Further, in a state where the automatic braking has not been executed, the state is maintained.

In step S9, the collision determination ECU 20 determines whether or not the IG power source of the own vehicle 100 is set to be off When the collision determination ECU 20 determines that the IG power source is not set to be off, the process is returned to step S1. On the other hand, when the collision determination ECU 20 determines that the IG power source is set to be off, the process of the flow chart shown in FIG. 3 is ended. By the process step of step S9 being performed, while the IG power source of the own vehicle 100 is on, the process steps described above are repeatedly performed.

Figure 4:
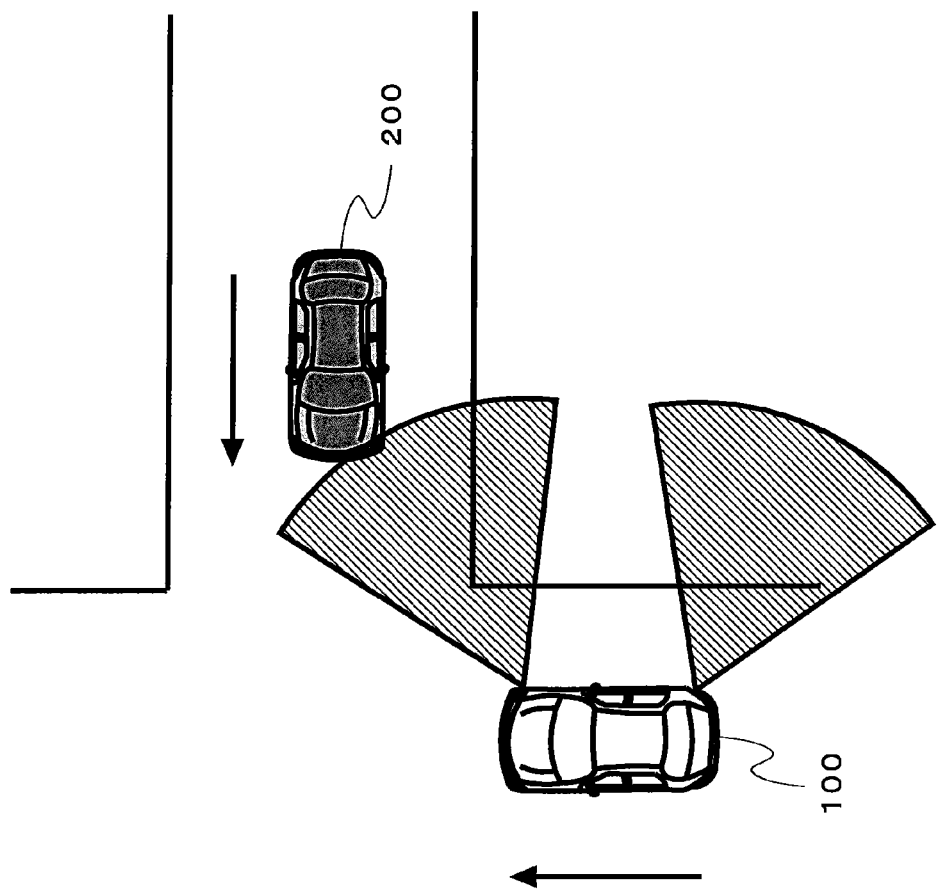
FIG. 4 is a plan view illustrating a positional relationship between the own vehicle 100 and another vehicle 200, which is obtained at time t1.
Figure 5:
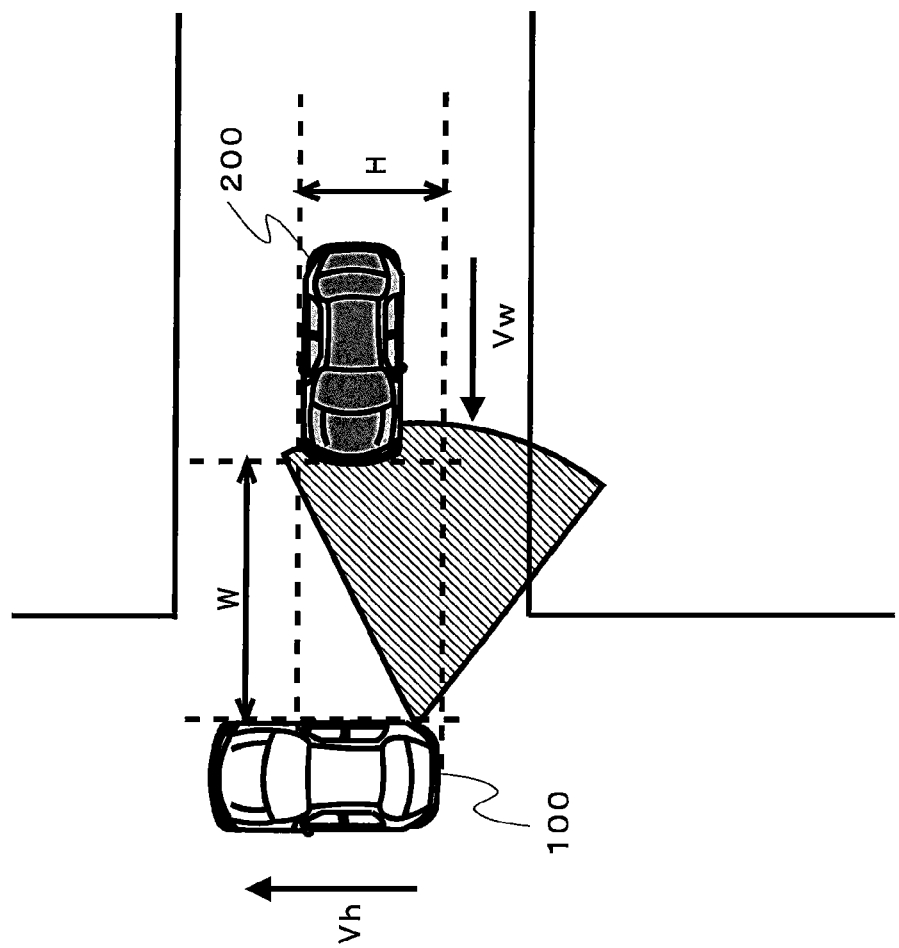
FIG. 5 is a plan view illustrating a positional relationship between the own vehicle 100 and the other vehicle 200, which is obtained at time t2.
Figure 6:
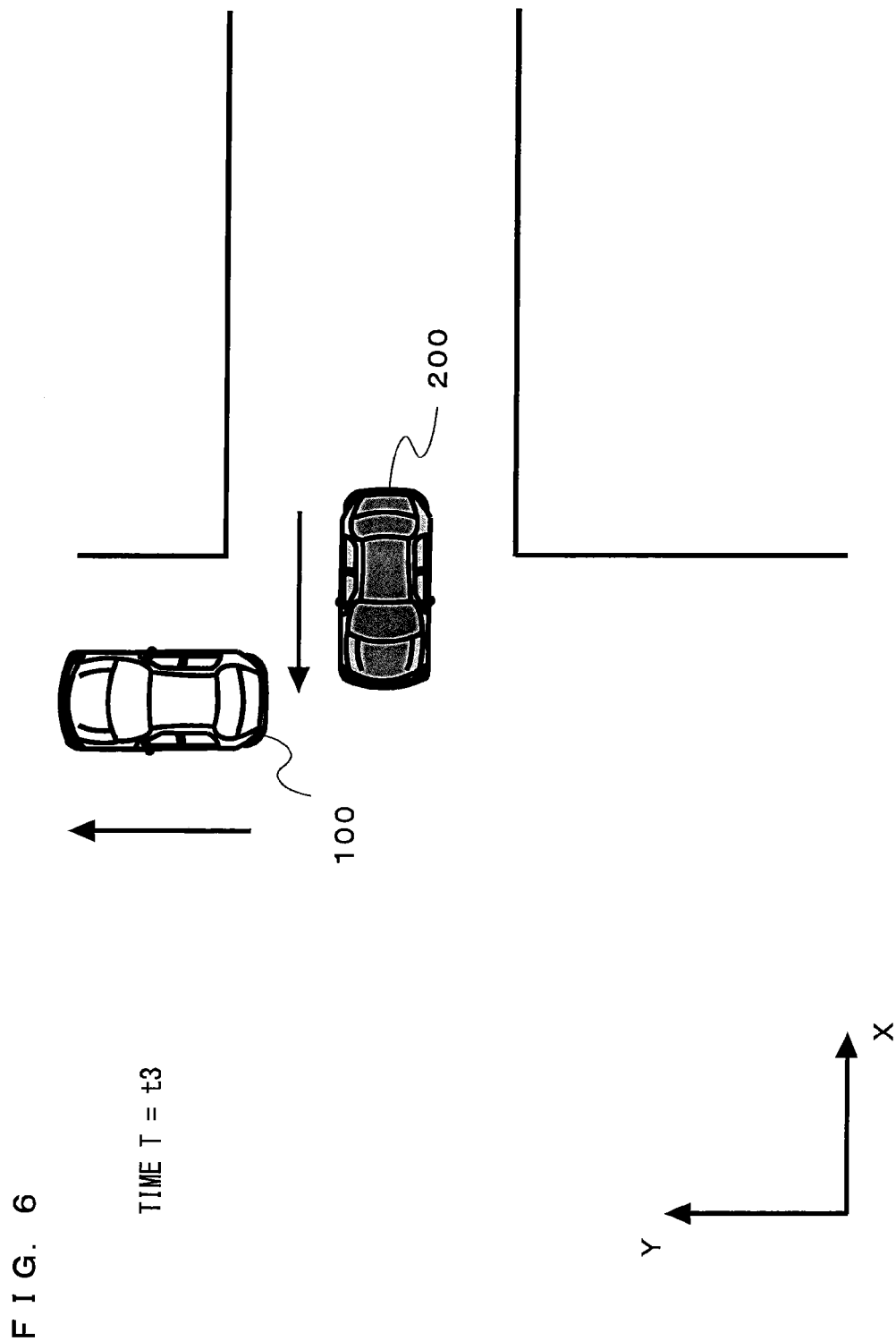
FIG. 6 is a plan view illustrating a positional relationship between the own vehicle 100 and the other vehicle 200, which is obtained at time t3.

Next, a state in which the collision avoidance apparatus 1 enables the own vehicle 100 to avoid a collision with the movable object will be described with reference to FIG. 4 to FIG. 6. Hereinafter, an exemplary case in which the other vehicle 200 is detected as the movable object approaching the own vehicle 100 will be described. FIG. 4 is a plan view illustrating a positional relationship between the own vehicle 100 and the other vehicle 200, which is obtained at time t1. FIG. 5 is a plan view illustrating a positional relationship between the own vehicle 100 and the other vehicle 200, which is obtained at time t2 at which a predetermined time period has elapsed since time t1. FIG. 6 is a plan view illustrating a positional relationship between the own vehicle 100 and the other vehicle 200, which is obtained at time t3 at which a predetermined time period has elapsed since time t2.

As shown in FIG. 4, at time t1, the other vehicle 200 is travelling on a road orthogonal to a road on which the own vehicle 100 is travelling. Namely, the other vehicle 200 approaches the right lateral side portion of the own vehicle 100 at an intersection. When the front-lateral side radar 11 detects the other vehicle 200, the collision determination ECU 20 determines whether or not a risk that the other vehicle 200 and the own vehicle 100 collide with each other is high, in the process steps of step Si and step S2 described above. When the collision determination ECU 20 determines that a risk that the other vehicle 200 and the own vehicle 100 collide with each other is high, the automatic braking is started, to decelerate the own vehicle 100. Such an automatic braking is performed in order to avoid a collision between the own vehicle 100 and the other vehicle 200 by the own vehicle 100 reducing its speed or stopping short of the other vehicle 200, and the other vehicle 200 passing in front of the own vehicle 100.

On the other hand, even when the own vehicle 100 reduces its speed, it may be difficult for the other vehicle 200 to pass in front of the own vehicle 100, depending on a state in which the other vehicle 200 is travelling. For example, as shown in FIG. 5, in a case where, at the time 2 at which the predetermined time period has elapsed since time t1, the own vehicle 100 has been travelling on a route on which the other vehicle 200 travels, even if the own vehicle 100 is decelerated, it is difficult for the other vehicle 200 to pass in front of the own vehicle 100. In such a case, the collision determination ECU 20 reduces the braking force of the automatic braking in the process steps of step S6 to step S8 described above.

When the braking force of the automatic braking is reduced, the deceleration of the own vehicle 100 is reduced. Namely, the own vehicle 100 continues to travel without reducing its speed or stopping. Therefore, as shown in FIG. 6, at time t3 at which the predetermined time period has elapsed since time t2, the own vehicle 100 passes in front of the other vehicle 200. Thereafter, the other vehicle 200 passes behind the own vehicle 100. Namely, a collision between the own vehicle 100 and the other vehicle 200 can be avoided.

As described above, the collision avoidance apparatus 1 according to the first embodiment of the present invention can execute an appropriate vehicle control for avoiding a collision between the own vehicle 100 and a movable object. Namely, the collision avoidance apparatus 1 can avoid a collision between the own vehicle 100 and a movable object more assuredly as compared to in conventional arts.

(Second Embodiment)

In the first embodiment, an exemplary case is described in which the collision determination ECU 20 controls the brake device 30 to reduce the braking force of the automatic braking, thereby controlling the accelerated state or decelerated state of the own vehicle 100. However, the collision determination ECU 20 may control a driving device of the own vehicle 100, to accelerate the own vehicle 100. Hereinafter, a collision avoidance apparatus 2 according to a second embodiment will be described.

Figure 7:
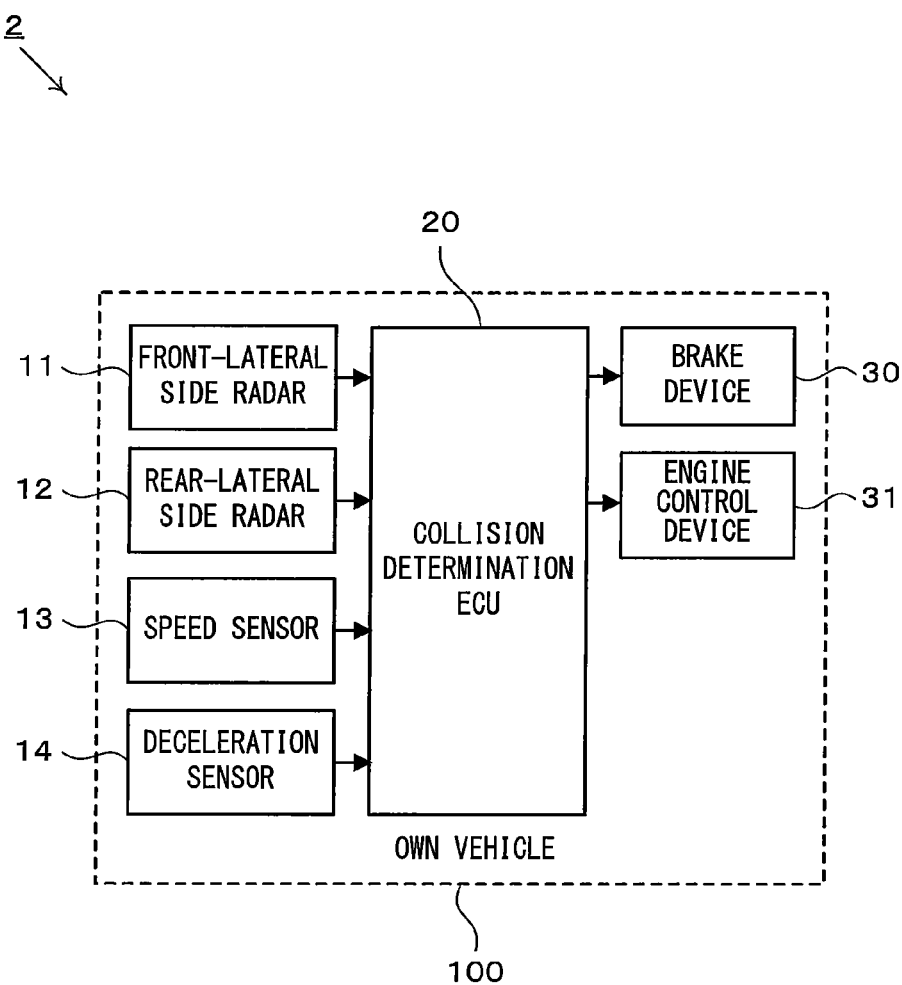
FIG. 7 is a block diagram illustrating a structure of the collision avoidance apparatus 1 according to a second embodiment.

FIG. 7 is a block diagram illustrating a structure of the collision avoidance apparatus 2 according to the second embodiment. As shown in FIG. 7, the collision avoidance apparatus 2 includes the front-lateral side radar 11, the rear-lateral side radar 12, the speed sensor 13, the deceleration sensor 14, the collision determination ECU 20, the brake device 30, and an engine control device 31. The same components as described for the first embodiment are denoted by the same corresponding reference numerals, and a detailed description thereof is not given.

The engine control device 31 is a device for controlling the number of times an engine of the own vehicle 100 rotates, to control a driving force for the own vehicle 100. The engine control device 31 is typically an electronically controlled engine throttle. The engine control device 31 is electrically connected to the collision determination ECU 20. The engine control device 31 controls a driving force for the own vehicle 100 according to an instruction signal received from the collision determination ECU 20.

Figure 8:
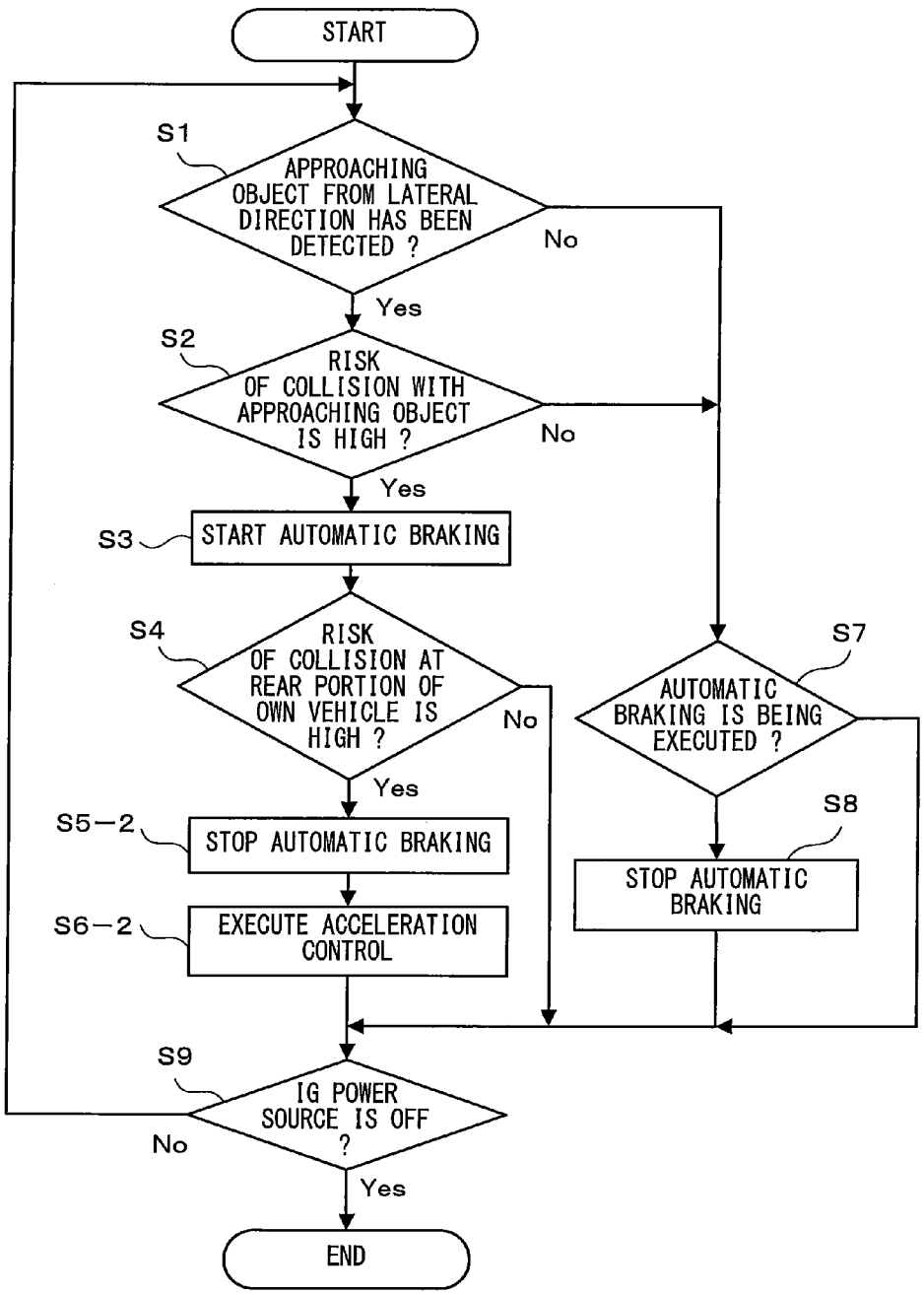
FIG. 8 is a flow chart showing a process performed by the collision determination ECU 20 according to the second embodiment.

Next, a process performed by the collision determination ECU 20 according to the second embodiment will be described with reference to FIG. 8. FIG. 8 is a flow chart showing a process performed by the collision determination ECU 20 according to the second embodiment. In the flow chart shown in FIG. 8, the same process steps as described with reference to the flow chart of FIG. 3 for the first embodiment are denoted by the same corresponding numbers, and a detailed description thereof is not given.

In the flow chart shown in FIG. 8, the collision determination ECU 20 firstly performs process steps of step Si to step S4 described above. The collision determination ECU 20 performs process steps of step S5-2 and step S6-2 described below, instead of the process steps of step S5 and step S6.

Specifically, when the collision determination ECU 20 determines in step S4 that a risk that the own vehicle 100 collides with the movable object in the rear portion f the own vehicle 100 is high (Yes in step S4), the automatic braking is stopped (step S5-2). More specifically, the collision determination ECU 20 transmits, to the brake device 30, an instruction signal for stopping the automatic braking. When the collision determination ECU 20 has completed the process step of step S5-2, an acceleration control is executed (step S6-2). Specifically, the collision determination ECU 20 outputs, to the engine control device 31, an instruction signal for increasing the driving force. When the collision determination ECU 20 has completed the process step of step S6-2, the process is advanced to step S9.

In the process steps of step S5-2 and step S6-2, when a risk that the own vehicle 100 collides with the movable object in the rear portion of the own vehicle 100 is high, the accelerated state or decelerated state of the own vehicle 100 is controlled so as to accelerate the own vehicle 100. Therefore, in a case where the own vehicle 100 attempts to avoid a collision by passing in front of the movable object, even if a speed of the own vehicle is insufficient, the collision between the own vehicle 100 and the movable object can be avoided with enhanced certainty.

As described above, the collision avoidance apparatus 2 according to the second embodiment of the present invention can execute an appropriate vehicle control for avoiding a collision between the own vehicle 100 and a movable object, similarly to the collision avoidance apparatus 1 according to the first embodiment.

The collision determination ECU 20 according to the second embodiment may perform the process steps of step S5-2 and step S6-2 after the process step of step S5 described above has been performed. Specifically, when the collision determination ECU 20 determines in step S4 that a risk that the own vehicle 100 collides with the movable object in the rear portion of the own vehicle 100 is high (Yes in step S4), the target deceleration GT is calculated in the process step of step S5. When the collision determination ECU 20 has completed the process step of step S5, the automatic braking is stopped in the process step of step S5-2. The collision determination ECU 20 accelerates the own vehicle 100 in the process step of step S6-2 such that the deceleration G becomes less than or equal to the target deceleration GT.

In the second embodiment, an exemplary case in which the driving device of the own vehicle 100 is an engine is described. However, the driving device of the own vehicle 100 may be an electric motor. In such a structure, the collision determination ECU 20 outputs, to a control device for controlling the electric motor, an instruction signal for controlling a driving force by the electric motor.

In each of the embodiments described above, an exemplary case in which the front-lateral side radar 11 and the rear-lateral side radar 12 are mounted to the own vehicle 100 on the right side of the own vehicle 100 is described. However, the front-lateral side radar 11 and the rear-lateral side radar 12 may be mounted to the own vehicle 100 on the left side of the own vehicle 100. Further, the front-lateral side radar 11 and the rear-lateral side radar 12 may be mounted on each of the right and left sides thereof.

Industrial Applicability

The collision avoidance apparatus according to the present invention is useful as, for example, a collision avoidance apparatus that enables execution of an appropriate vehicle control for avoiding collision between vehicles.

DESCRIPTION OF THE REFERENCE CHARACTERS 1, 2 collision avoidance apparatus
11 front-lateral side radar
12 rear-lateral side radar 13 speed sensor
14 deceleration sensor
20 collision determination ECU 20
30 brake device
31 engine control device
100 own vehicle
200 another vehicle

The invention claimed is:

1. A collision avoidance apparatus for avoiding a collision between an own vehicle and a movable object, the collision avoidance apparatus comprising:
   a laterally-existing movable object detector configured to detect a movable object that approaches from a direction lateral to the own vehicle; and
   an electronic control unit including:
      a side collision determination section configured to determine whether or not a risk that the own vehicle and the movable object collide with each other is high, when the laterally-existing movable object detector detects that the movable object approaches from the direction lateral to the own vehicle;
      an automatic deceleration section configured to start a deceleration control for automatically decelerating the own vehicle, when the side collision determination section determines that the risk that the own vehicle and the movable object collide with each other, is high;
      a passage and avoidance determination section configured to determine, while the deceleration control for the own vehicle is being executed by the automatic deceleration section, whether or not a possibility that the own vehicle passes in front of the movable object and a collision between the own vehicle and the movable object can be avoided if an accelerated state or a decelerated state of the own vehicle is changed, is high;
      a driving force controller configured to control a driving force for the own vehicle; and
      an accelerated state/decelerated state controller configured to control the automatic deceleration section to stop the deceleration control and control the driving force controller to enhance the driving force for the own vehicle to accelerate the own vehicle when the passage and avoidance determination section determines that a possibility that a collision between the own vehicle and the movable object can be avoided by the accelerated state or the decelerated state of the own vehicle being changed, is high.

2. The collision avoidance apparatus according to claim 1, wherein
   the passage and avoidance determination section is configured to determine whether or not a risk that the movable object collides with the own vehicle in a rear lateral end portion of the own vehicle is high, and
   the passage and avoidance determination section is configured to determine, when determining that the risk that the movable object collides with the own vehicle in the rear lateral end portion of the own vehicle is high, that a possibility that the collision between the own vehicle and the movable object can be avoided by the own vehicle passing in front of the movable object, is high.

3. The collision avoidance apparatus according to claim 2, wherein
   the laterally-existing movable object detector includes:
      a front-lateral side radar device configured to detect an object that exists front-lateral to the own vehicle; and
      a rear-lateral side radar device configured to detect an object that exists rear-lateral to the own vehicle, and
   the side collision determination section is configured to determine whether or not a risk that the own vehicle and the movable object collide with each other is high, based on an object detection result obtained by the front-lateral side radar device and the rear-lateral side radar device.

4. The collision avoidance apparatus according to claim 3, wherein
   the passage and avoidance determination section includes:
      a rear-lateral side radar detection determination section configured to determine whether or not the movable object has been detected by the rear-lateral side radar device;
      a time determination section configured to calculate a predicted time that is to elapse before the movable object collides with the own vehicle, and configured to determine whether or not the predicted time indicates a value less than or equal to a predetermined threshold value;
      a predicted position determination section configured to calculate a predicted position of the own vehicle and a predicted position of the movable object which are to be obtained when the predicted time has elapsed, and configured to determine whether or not the predicted position of the movable object is within a range defined relative to the predicted position of the own vehicle; and
      an overall determination section configured to determine that a risk that the movable object collides with the own vehicle in a rear lateral end portion of the own vehicle, is high, when the rear-lateral side radar device has detected the movable object, the predicted time indicates a value less than or equal to the predetermined threshold value, and the predicted position of the movable object is within the range defined relative to the predicted position of the own vehicle.

* * * * *